United States Patent [19]
Kuster et al.

[11] Patent Number: 5,830,253
[45] Date of Patent: Nov. 3, 1998

[54] STRAIGHT-THROUGH FURNACES FOR HEATING GLASS SHEETS TO BENDING AND/OR TOUGHENING TEMPERATURE

[75] Inventors: Hans-Werner Kuster, Aachen; Werner Diederen, H'Rath; Carsten Bremer, Baesweiler; Wilfried Korsten, Heinsberg; Hans-Josef Promper, Aachen; Reiner Zanders, Wurselen, all of Germany

[73] Assignee: Saint-Gobain Vitrage S.A., Courbevoie, France

[21] Appl. No.: 547,864

[22] Filed: Oct. 25, 1995

[30] Foreign Application Priority Data

Oct. 26, 1994 [DE] Germany ............... 44 38 261.8

[51] Int. Cl.$^6$ ................................ C03B 23/00
[52] U.S. Cl. ............................................. 65/273
[58] Field of Search ................ 219/385, 388; 373/27, 28, 29; 65/271, 273, 104

[56] References Cited

U.S. PATENT DOCUMENTS

| | | | |
|---|---|---|---|
| 4,950,320 | 8/1990 | Vanaschen et al. | 65/273 |
| 5,028,250 | 7/1991 | Deb et al. | 65/289 |
| 5,131,937 | 7/1992 | Kuster et al. | 65/181 |
| 5,388,532 | 2/1995 | Wakamo | 185/55.1 |
| 5,651,805 | 7/1997 | Kuster et al. | 65/273 |

*Primary Examiner*—Matthew V. Nguyen
*Attorney, Agent, or Firm*—Oblon, Spivak, McClelland, Maier & Neustadt, P.C.

[57] ABSTRACT

A straight-through furnace for the heating of glass sheets to their bending and/or toughening temperature is provided with a conveying system bringing the glass sheets (2) in a horizontal position through the furnace (1). The conveying system includes a series of support plates (6). The support plates (6) are each formed of a rigid frame, which is equipped in the manner of a drum skin with a heat-resistant membrane (8) as the support surface for the glass sheet (2).

11 Claims, 5 Drawing Sheets

STRAIGHT-THROUGH FURNACES FOR HEATING GLASS SHEETS TO BENDING AND/OR TOUGHENING TEMPERATURE

BACKGROUND OF THE INVENTION

1. Field of the Invention

This invention relates to a straight-through furnace for the heating of glass sheets to their bending and/or toughening temperature, comprising a conveying system which conveys the glass sheets in a horizontal position through the furnace.

2. Description of the Related Art

For heating glass sheets to their bending and/or toughening temperature, furnaces comprising a conveying system, composed of driven conveying rollers known from the document DE 2 319 049, have achieved widespread use. In these known straight-through roller furnaces, the glass sheets are each supported by the upper generatrices of the successive cylindrical conveying rollers. In the hot end zone of the furnace, in which the glass sheets have already reached their bending temperature, this can result, depending upon the conveying speed and thickness of the glass sheets, in slight optically disturbing deformations of the glass sheets when they bend slightly between the conveying rollers under the effect of their own weight. This disadvantage becomes more serious with decreasing thickness of the glass sheets being processed.

For reducing or preventing the deformations appearing in the case of said straight-through roller furnaces, it is known, for example from document DE 2 741 098 A1, to install between the conveying rollers, and below the conveying plane, nozzles through which hot air is blown against the underside of the glass sheets. However, since the dynamic pressure opposing the gravitational force on the glass sheet can compensate for only a part of the weight of the glass sheets, so that sufficient friction force remains between the rollers and the glass sheets to assure the displacement thereof, the risk of deformation of the glass sheets with such a furnace cannot be completely eliminated.

A uniform support for the glass sheets can be achieved by means of furnaces having a gas bed or air cushion, in which a gas mattress is created by a support bed equipped with feed openings for hot gas or hot air. In the case of such furnaces known, for example, from documents DE-OS-1 471 986 or DE-AS-1 431 615, supplementary devices are provided for the forward conveying of the glass sheets. For example, in the case of a support bed with inclined mounting, such devices are constituted by driven rollers acting on the lower face of the glass sheets or, in the case of a horizontally mounted support bed, are constituted by driving elements mounted on chains, which act on the rear edges of the glass sheets. With such furnaces, deformations of the glass sheets caused by the weight of these sheets can be avoided with certainty, but these furnaces are as a general rule very expensive.

As mentioned earlier, deformations of the glass sheets resulting from a non-uniform support in the hot region of the furnace become all the more serious for thinner glass sheets. However, there exists a growing trend towards bending and, where applicable, toughening relatively thin glass sheets of, e.g., 2 mm or less thickness, for the purpose of converting such thin glass sheets into laminated glass panes, in particular burglar-resistant lateral window panes for automobiles. In this application, the optical quality of the individual glass sheets is particularly important, because optical defects of the individual glass sheets have an amplifying effect in the pane of the laminated glass.

SUMMARY OF THE INVENTION

It is therefore an object of the invention to provide a structurally simple furnace for the heating of glass sheets to their bending and/or toughening temperature, which assures a uniform support of the glass sheet over the entirety of its surface in such a way that deformations of the glass sheets due to their own weight are eliminated.

According to this invention, this object is achieved, in the case of a furnace of the type specified, by providing the conveying system within the furnace with a series of support plates which each comprise a rigid frame equipped, in the manner of a drum skin, with a heat-resistant membrane as a support surface for a glass sheet.

Whereas, in the known straight-through furnace, the glass sheets travel relative to the support bodies, in the case of this invention they are each placed upon a support which is conveyed together with the glass sheet through the furnace. This offers the advantage that no surface damage to the glass sheets can be caused by a displacement relative to the support bodies. In addition, the principal object of the invention is achieved by the fact that the glass sheets rest over the entirety of their surface on the substrate that carries them. In this case, it is particularly significant that the substrate carrying the glass sheet is made of a membrane which, as a result of its low mass, has a low thermal capacity and good thermal conductivity. This support membrane should be so designed as not to substantially influence the supply of heat to the lower face of the glass sheet, so that the heating of the glass sheets from both sides takes place approximately at the same heating rate. In effect, when the supply of heat to both sides of the glass sheets is different, this results in a camber in the glass sheets, because these glass sheets expand more rapidly on the side that is more heated than on the other side.

An absolutely equal rate of heating on both sides of the glass sheet can only be achieved with difficulty, even with the help of the device according to this invention. Even when the glass sheet rests on a support of the membrane type, in a radiation furnace the underside of the glass sheets generally heats up more rapidly than the top side. This is due to the fact that the infrared radiation is more absorbed by the material of the support membrane than by the upper face of the glass sheet and that the heat transfer from the membrane to the glass sheet by thermal conduction takes place fairly rapidly. In this case also, the glass sheets therefore easily curve.

It is possible for the invention to overcome this slight curving effect by adapting the tension in the support membrane to the curvature that develops, in particular by choosing the tension in such a way that the flexion of the membrane corresponds to the curve of the glass sheet. In this way, the glass sheets themselves remain supported in a uniform manner over the entirety of their surface when they curve to a greater or less extent. In contrast, in the case of a rigid plane support substrate, the curvature of the glass sheet would have the consequence that the weight of the sheet would be entirely supported by the central zone remaining in contact with the support. This would, however, inevitably lead to a dented surface deformation of the glass sheet, which could not be completely eliminated even during a later pressing operation.

The furnace according to this invention has, in addition, the essential advantage that the operation of transferring the heated glass sheet at the end of the furnace to a bending mold situated downstream is substantially simplified. In conventional straight-through furnaces, an accurate positioning of the glass sheet is required before the transfer of the hot glass sheet onto the bending mold, i.e., a displacement of the glass sheet into a position established with accuracy or a measurement of its position followed by corresponding adjustment of the transfer tools.

However, this process step is superfluous in the furnace according to this invention. In the conveying system according to this invention, the glass sheet in effect retains its relative position with respect to the support plate in question, inside the furnace. The support plates themselves may be simply brought, in an accurately determined position, into the depositing station at the entry to the furnace and into the transfer station at the other end of the furnace by appropriate mechanical means, with the result that the position of the glass sheet itself is automatically determined.

In the furnace according to this invention, it is therefore sufficient, during the deposition of the glass sheet at the entry to the furnace onto the support plate in question, to perform a precise positioning thereon of the glass sheet, as a result of which the position of the hot glass at the other end of the furnace is automatically given. In this way the positioning operation, which proves to be relatively difficult for a glass sheet at its deformation temperature, can be carried out in advance in the cold zone at the front of the furnace, which represents an important advantage under production conditions.

The stacking and driving of the individual support plates can be carried out in various ways. The individual support plates may be mounted on an endless conveyor chain to form a plate conveyor having its upper side and its lower side entirely inside the furnace. Such a construction of the furnace is especially economical from the energy aspect. The support plates may instead be returned in closed circuit outside the furnace, as is commonly the case, for example, in a bending furnace of the type using skeleton frames.

The invention envisages a drive for these support plates within a furnace having a horizontal longitudinal axis, that is, a furnace in which the support plates follow a horizontal trajectory to bring the glass sheets from the entry of the furnace to the other end of the furnace.

According to a variant of the invention, the driving of these support plates takes place in a furnace having a vertical longitudinal axis, that is to say a furnace in which the support plates follow essentially a vertical trajectory to bring the glass sheets from the entry of the furnace to the other end of this furnace.

BRIEF DESCRIPTION OF THE DRAWINGS

Other advantages and details of the invention will be apparent from the dependent claims and the following description of various examples of embodiment, given with reference to the attached drawings, in which:

DETAILED DESCRIPTION OF THE PREFERRED EMBODIMENTS

Figure 1:
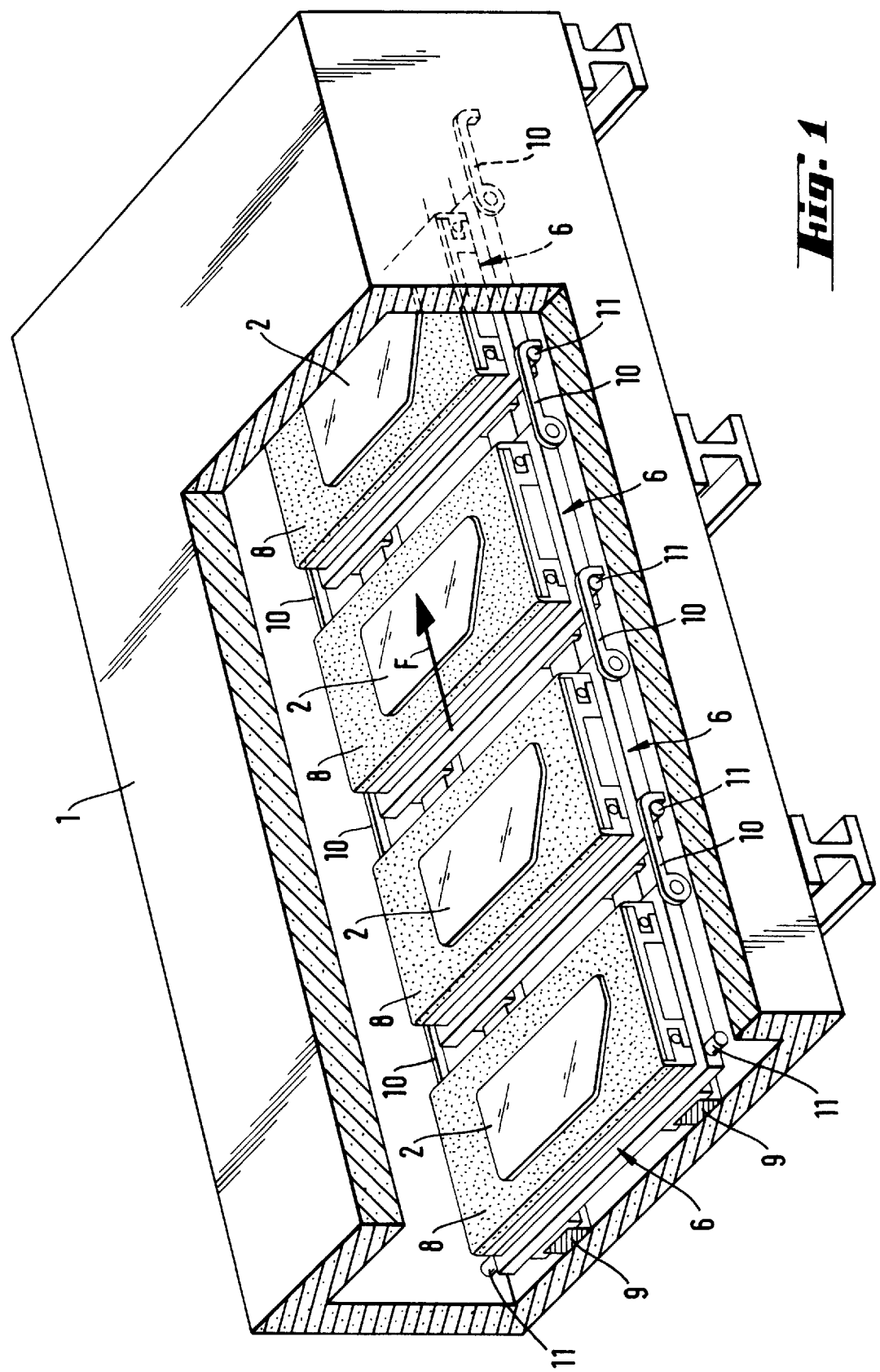
FIG. 1 is a partly cut away perspective view of the basic structure of a furnace according to this invention.

As FIG. 1 shows, a furnace according to the invention has essentially the form of a tunnel furnace 1 in which the glass sheets 2 are conveyed in a horizontal direction in a horizontal position in the direction of carrier F through the furnace and, in this case, are heated to their bending or toughening temperature of approximately 650° C. The heating is provided by conventional electrical heating devices which, in the interest of clarity, are not shown. In the case of the tunnel furnace 1, this is a largely closed furnace which does not have openings except at the start and the end, for the entry of the cold glass sheets and the exit of the heated glass sheets. Depending upon the construction of the conveying system, the furnace may also have continuous longitudinal slits in its side walls through which suitable coupling elements travel, these elements leading to a drive device installed outside the furnace.

The conveying system by means of which the glass sheets are conveyed through the furnace 1 comprises a series of membrane support plates 6, disposed one behind another in the longitudinal direction of the furnace, and on which the plane glass sheets 2 are placed. The membrane support plates 6 are each essentially constituted of a frame made of a metal profile having a membrane 8, in the manner of a drum skin, made of a heat-resistant material. The structure of such a membrane support plate 6 will be explained in detail later with reference to FIG. 2.

The membrane support plates 6 are displaceably mounted in an appropriate manner along the length of the furnace, for example on wheels, not shown, running on rails 9. Adjacent membrane support plates 6 are connected to one another by means of latches 10. The latches 10 are pivotally mounted on one end of one membrane support plate, and latch via a lug 11 onto the opposite end of the adjacent membrane support plate in such a way that the membrane support plates 6, after the glass sheet has been removed at the end of the furnace, may be uncoupled for the purpose of their return by raising the latch 10 associated with each of them. After the membrane support plates 6 have been returned in closed circuit to the entry of the furnace, they are again deposited on the rails 9 and are coupled by means of the latches 10 to the preceding membrane plate 6.

Figure 2:
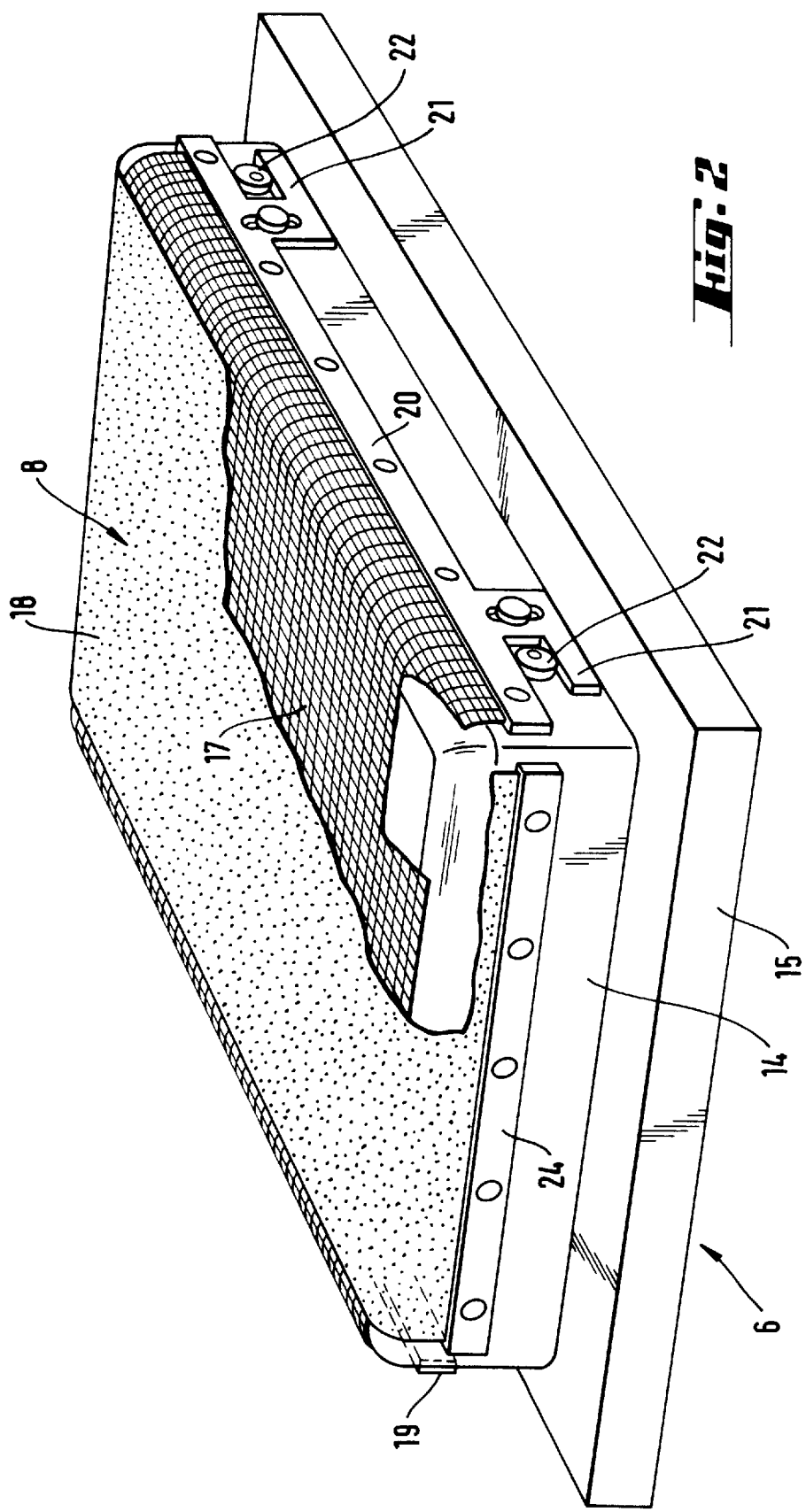
FIG. 2 is a perspective view of a support plate.

As FIG. 2 shows in detail, each membrane support plate 6 comprises a frame, for example rectangular frame 14 made of profiled tubes or bars. The frame 14 is, in the case shown, mounted on a support base 15 which is provided with appropriate means for conveying through the furnace. The membrane 8, made of a heat-resistant fabric, is stretched like a drum skin on the frame 14. The heat-resistant fabric may, for example, be a glass fiber cloth. Woven structures of heat-resistant metal fibers have proved particularly suitable for this purpose.

The membrane 8 must be held under a tension such that it forms a plane surface as far as is possible. As a consequence of thermal expansion, the membrane 8 does, of course, lose some tension and sags a little under the weight of the glass sheet. As noted above, however, this bending does not harm the glass sheet insofar as possible deformations are concerned, because even a slightly curved glass sheet rests entirely upon the membrane, with the result that the load per unit area is very uniform.

A membrane structure constituted of two superimposed thicknesses of fabric, that is a lower woven fabric 17 and an upper woven or knitted fabric 18, has proved particularly satisfactory. The thickness of the lower woven fabric 17 must guarantee the necessary tension in the membrane, while the thickness of the upper woven or knitted fabric 18 is chosen to form an optimum substrate for the glass sheets.

The fabric 17 is disposed and tensioned in such a way that the warp threads extend in the direction of the forces that provide the tension. The woven fabric 17 is fixed, at one of the ends of the warp threads, by means of a lath 19, to the outer lateral surface of the frame 14. At the opposite end, a metal lath 20 is permanently connected to the fabric 17. The metal lath 20 is provided with hook-shaped tensioning projections 21. The hook-shaped tensioning projections 21 engage behind revolving cylindrical discs 22 which are mounted in eccentric rotation on the frame 14. By rotating these cylindrical discs 22 with their eccentric mountings, it is possible to tension the fabric 17.

For the upper fabric 18 there is preferably used a knitted or mesh fabric which has a higher elasticity than that of a woven fabric, and the fine structure of which consequently adapts well to the surface of the glass.

The rectangular knitted fabric 18 is also fixed along one side to the frame 14 by means of a metal lath 24, whereas the opposite side is provided with a tensioning lath similar to lath 20, by means of which the knitted fabric 18 is tensioned.

The dimensions in plan of the frame 14 and of the membrane 8 must be chosen such that the internal dimensions of the frame 14 are larger than the plan dimensions of the glass sheets to be conveyed, so that the latter rest entirely on the free tensioned zone of the membrane 8 inside the frame 14.

Figure 3:
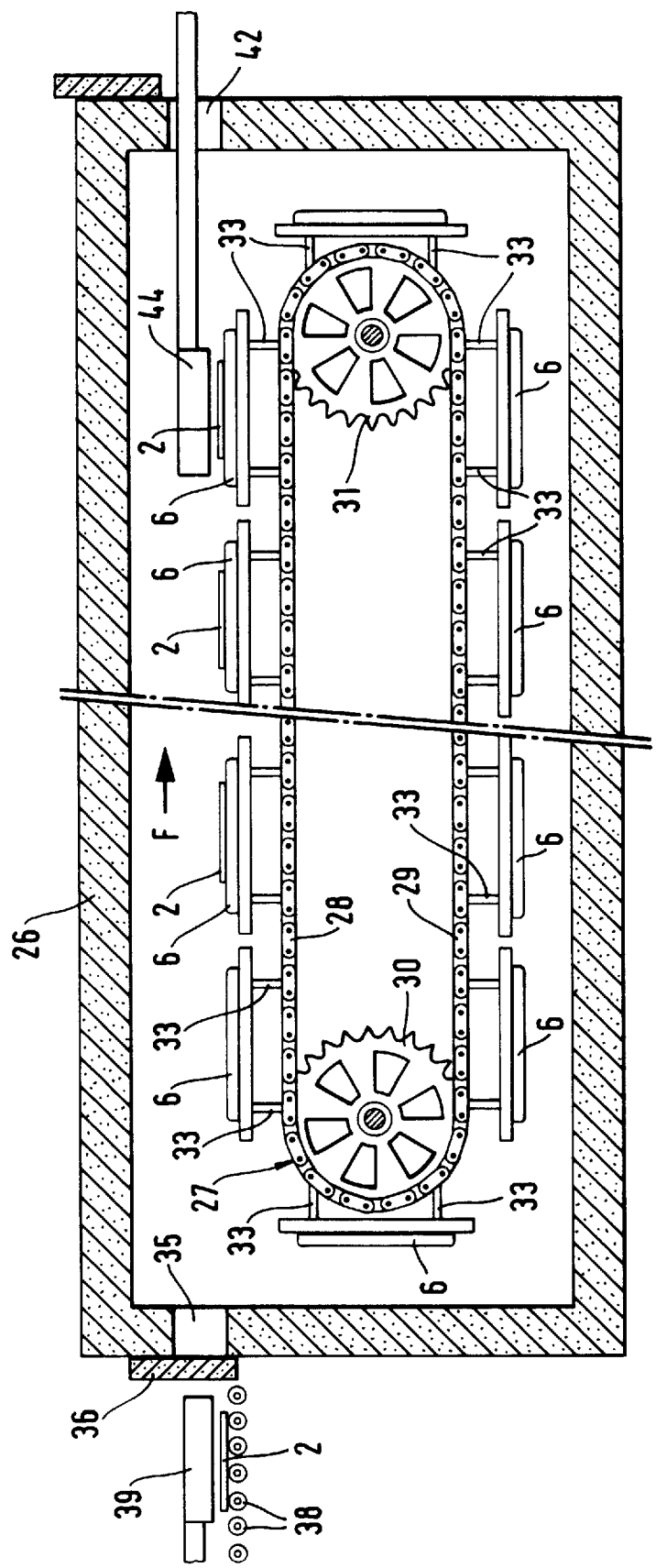
FIG. 3 is a longitudinal section view through a furnace according to this invention, with return of the support plates inside the furnace.

It being understood that the membrane support plates 6, after the hot glass sheets have been removed, must be returned in closed circuit to the cold end of the furnace, a corresponding conveying system is necessary for this purpose. A first embodiment of a furnace equipped with a conveying system suitable for this purpose is illustrated in FIG. 3. In this case the entirety of the conveying device is installed inside the furnace enclosure 26. The conveying device is constituted, essentially, of an endless chain conveyor belt 27 comprising an upper side 28 for conveying the glass sheets in the direction of arrow F and a lower side 29 for returning the empty membrane support plates 6. The chain conveyor belt 27 passes over corresponding chain wheels 30 and 31, one of which is rotationally driven by means of a drive shaft extending to the outside, by a drive mechanism installed outside the furnace enclosure 26. Each membrane support plate 6 is fixed by columns 33 to the chain conveyor belt 27.

At the cold end of the furnace, the membrane support plates 6 are loaded with the glass sheets 2 through an opening 35, which may be closed by a door 36. For this purpose, the glass sheets 2 which are brought, for example on a roller conveyor 38, into proximity to the furnace, are prepositioned on this roller conveyor 38, that is, they are in an accurately predetermined position.

Accurate positioning at this location is important for the subsequent process, particularly for the bending operation carried out downstream of the furnace. By means of a suction cup plate 39, which is in a defined position above the positioned glass sheet 2, the glass sheet 2 is raised from the roller conveyor 38. After the door 36 has been opened, the glass sheet 2 is accurately conveyed into the furnace by a predetermined distance and is deposited in the furnace on a membrane support plate 6 which, at the instant of the deposition of the glass sheet 2, also occupies a precisely defined position.

In analogous manner, the removal of the hot glass sheets at the end of the furnace is performed through the opening 42 by means of the horizontally movable suction cup plate 44. In this case also, it is necessary for the suction cup plate 44 and the relevant membrane support plate 6 to occupy, at the instant of transfer of the hot glass sheet, relative positions that are determined with accuracy. The control of position necessary for this purpose may also be assured by known means with a relatively high accuracy. After the taking-over of the hot glass sheet 2 by the suction cup plate 44, the latter enters the adjacent bending station, not shown, and deposits the glass sheet on the lower bending mould. In view of the fact that this horizontal displacement of the suction cup plate 44 takes place over a distance of travel that is also predetermined with accuracy, the exact position required of the hot glass sheet on the bending mould is automatically obtained.

Figure 4:
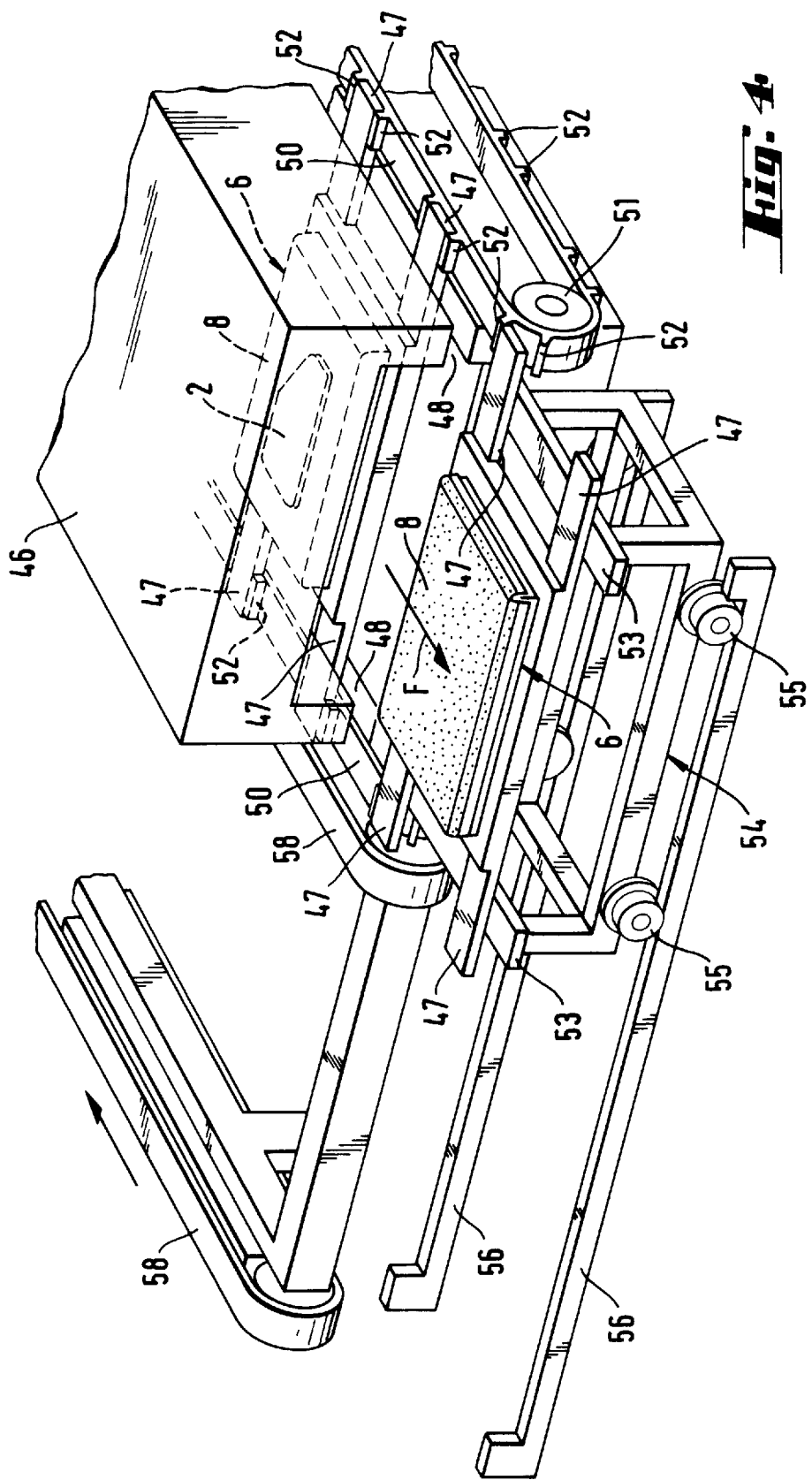
FIG. 4 is a perspective view of a furnace according to this invention, with return of the support plates outside the furnace.

FIG. 4 illustrates another embodiment of a furnace according to this invention, equipped with another conveying system, in which the membrane support plates 6, after the glass sheets 2 have been removed, are returned outside the furnace 46 to the cold end of the furnace. In this case, each membrane support plate 6 rests on two support rails 47, which pass through lateral slots 48 between the infrastructure and the superstructure of the furnace 46 and extend outside the enclosure of the furnace. Outside the furnace, these support rails 47 rest on narrow conveyor belts 50, which have the shape of endless belts and are driven at a regulated speed by driven return rollers 51. On the conveyor belts 50 are fixed retaining elements 52 forming a U, on which the support rails 47 for the membrane support plates 6 rest in a respective fixed position.

In this case also, it is important for the glass sheets 2 to be deposited on the membrane support plate in the loading station in a position fixed with the accuracy relative to this plate. In the removal station at the hot end of the furnace, the suction cup plate taking up the glass sheet therefore simply needs to be positioned with reference to the membrane support plate 6, but this can easily be done, for example by a mechanical coupling between the membrane support plate and the suction cup plate at the instant of taking-over of the glass sheet.

When the glass sheet 2 has been raised above the membrane support plate 6 at the hot end of the furnace, the membrane support plate 6 is removed from the furnace by the conveyor belt 50 and then by another device, not shown, the support rails 47 being brought onto rigid supports 53 of a carriage 54. The carriage 54 is movable on wheels 55 on rails 56 transversely to the longitudinal axis of the furnace 46 towards two extreme positions. Whereas the carriage 54, in the extreme position shown in the drawings, receives the membrane support plate 6 coming from the furnace 46, the membrane support plate 6, in the other extreme position of the carriage 54, is transferred onto conveyor belts 58, by means of which the membrane support plates 6 are conveyed and brought back to the cold end of the furnace. At this location, they are again brought, by means of a transverse conveying system corresponding to the carriage system described, into a position in which they are taken over by the conveyor belts 50 and again conveyed through the furnace 46.

Figure 5:
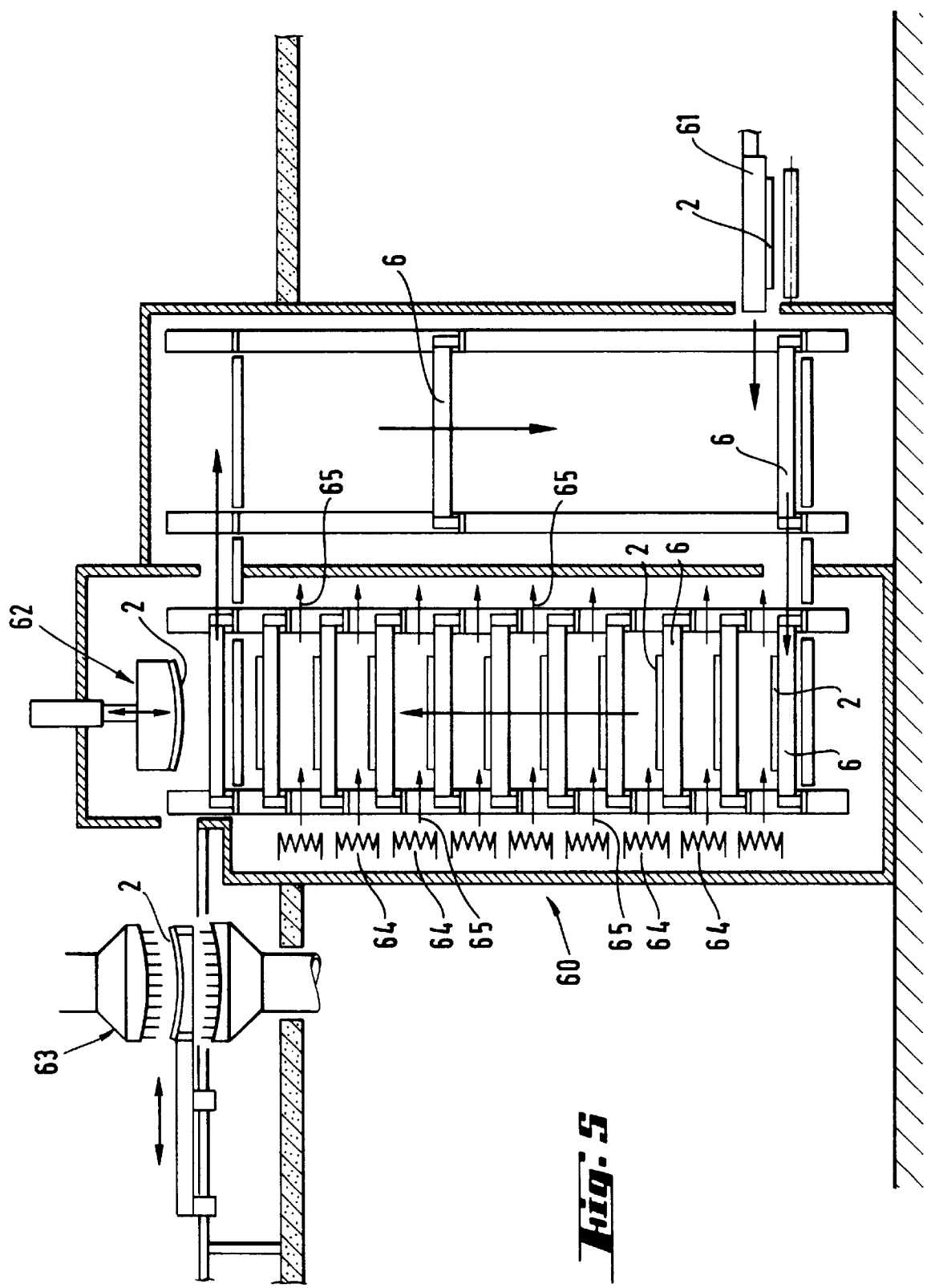
FIG. 5 is a longitudinal sectional view of a furnace according to this invention, the longitudinal axis of which is vertical.

FIG. 5 illustrates an embodiment of the invention inside a furnace 60, the longitudinal axis of which is vertical. Such a furnace may have various advantages. First of all it makes possible a considerable saving in space, at least in floor area. Furthermore it makes possible a more rapid heating of the glass sheets because of the greater heating by convection in this type of furnace. This more rapid heating is particularly advantageous in the case of thin glass sheets.

With regard to the entry of the cold glass sheets 2, this can take place as in the case of the tunnel furnaces already described. In FIG. 5, this is done by means of a suction cup plate 61. At the exit from the reheating phase, the glass sheets 2 are brought in a conventional manner to a bending station 62 and then to a toughening station 63. In FIG. 5 the bending station is situated within the furnace 60. The departure of the glass sheets from the furnace takes place in the same way as in the case of the tunnel furnaces. Inside the furnace 60, the support plates 6 follow a vertical movement in the direction of arrow F, that is to say upwards. The glass sheets having been released towards the bending station 62, the support plates 6 are brought back into a receiving position for cold glass sheets. The movement of these plates then takes place in a vertical direction downwards. Devices making possible the displacement of the support plates 6 in a vertical direction, these maintaining a horizontal position notably while they are supporting a glass sheet 6, are analogous to those described earlier in the case of the horizontal displacements through the tunnel furnaces.

The heating, for its part, may be produced by electrical resistance heaters 64, advantageously coupled to blowing devices, not shown in the Figures. These devices cause a circulation of air in the directions indicated by the arrows 65 and can contribute to increasing still further the rate of heating.

According to another variant, not illustrated here, the arrival of the glass sheets 2 can take place at the upper level and their departure at the lower level. In such a case, the movement of the support plates during the heating phase, and therefore that of the glass sheets 2, takes place in a downward vertical direction, which can further promote heating by convection.

What is claimed as new and is desired to be secured by Letters Patent of the United States is:

1. A straight-through furnace for the heating of glass sheets to at least one of their bending and toughening temperature, comprising a conveying system for carrying the glass sheets in a horizontal position through the furnace, said conveying system comprising a series of support plates, each said support plate comprising a rigid frame and a heat resistant membrane stretched in the manner of a drum skin on the frame, said membrane forming a support surface for a glass sheet.

2. The straight-through furnace according to claim 1, wherein a direction of movement of said conveying system through the furnace is horizontal.

3. The straight-through furnace according to claim 1, wherein a direction of movement of said conveying system through the furnace is vertical.

4. The straight-through furnace according to one of claims 1 to 3, wherein said membrane is made of a heat-resistant fabric.

5. The straight-through furnace according to claim 4, wherein said heat-resistant fabric is a fabric of heat-resistant metallic fibers.

6. The straight-through furnace according to claim 4 wherein said membrane comprises a lower layer made of a woven fabric having warp and weft threads and which can be tensioned on said support frame, and an upper layer made of a knitted or mesh fabric which adapts to the surface of the glass sheet.

7. The straight-through furnace according to claim 1, including a tensioning device for tensioning said membrane.

8. The straight-through furnace according to claim 1, wherein internal dimensions of the support frame are greater than plan dimensions of the glass sheets.

9. The straight-through furnace according to claim 1, wherein said support plates are mounted on an endless conveying chain to form a plate conveyor having upper and lower sides extending inside the furnace.

10. The straight-through furnace according to claim 1, wherein the furnace comprises a superstructure and an infrastructure separated by slits, including:
   conveyor belts running outside of the furnace and in a direction of movement of the glass plates, wherein said support plates include supporting rails which extend laterally through said slits and rest on said conveyor belts,
   a carriage at a downstream end of the furnace with respect to the direction of movement of the glass plates, said carriage being movable transversely to the direction of movement of the glass plates, and
   a conveying system composed of conveyor belts extending parallel to the direction of movement of the glass plates for returning the membrane support plates to an end of the furnace opposite said carriage.

11. Straight-through furnace according to claim 1, including movable suction cup plates for accurately depositing glass sheets onto said support plates.

* * * * *